Jan. 13, 1970  D. W. ROPER  3,489,038

DIFFERENTIAL MECHANISM

Filed Jan. 10, 1968  2 Sheets-Sheet 1

INVENTOR.
DANIEL W. ROPER
BY
Yount, Flynn & Tarolli
ATTORNEYS

Jan. 13, 1970     D. W. ROPER     3,489,038

DIFFERENTIAL MECHANISM

Filed Jan. 10, 1968     2 Sheets-Sheet 2

INVENTOR.
DANIEL W. ROPER
BY
Yount, Flynn & Tarolli
ATTORNEYS

United States Patent Office
3,489,038
Patented Jan. 13, 1970

3,489,038
DIFFERENTIAL MECHANISM
Daniel W. Roper, Rochester, Mich., assignor to Eaton Yale & Towne Inc., Cleveland, Ohio, a corporation of Ohio
Filed Jan. 10, 1968, Ser. No. 696,905
Int. Cl. F16h 1/44
U.S. Cl. 74—710.5         17 Claims

ABSTRACT OF THE DISCLOSURE

Disclosed herein is a differential drive mechanism having a limited capacity torque transmitting assembly for continuously interconnecting driving and driven members to retard relative rotation of the members with an initial or dampening torque which is equal to or less than a relatively small predetermined amount. The torque transmitting assembly includes a plurality of springs which are located in coaxial alignment with the driven members for pressing friction surfaces mounted for rotation with a carrier of the differential drive mechanism into engagement with friction surfaces mounted for rotation with the driven members. A clutch assembly is provided for drivingly interconnecting the driving and driven members to retard relative rotation between the driving and driven members by transmitting torque which is substantially larger than the capacity of the torque transmitting assembly.

---

The present invention relates to a drive mechanism, and more particularly to a limited slip differential drive mechanism having a limited capacity torque transmitting means for continuously interconnecting driven members to thereby retard relative rotation between the driven members with an initial or dampening torque.

A known limited slip differential includes driving and driven members which are interconnected by a clutch to retard relative rotation between the driving and driven members. In such a differential, operation of the clutch to an engaged position often results in what is frequently referred to as "drive line rattle." Drive line rattle occurs when the clutch in the differential is engaged rapidly and energy is stored from springy or resilient drive lines of which the differential is a component. This stored energy causes the clutch to rattle or cycle back and forth between engaged and disengaged positions.

Accordingly, it is an object of this invention to provide a drive line including a new and improved differential drive having a clutch and wherein means is provided in the differential for applying a limited dampening torque to the drive line before the clutch is operated to an engaged position to thereby prevent drive line rattle.

Another object of this invention is to provide a new and improved drive mechanism including a torque transmitting means continuously interconnecting driven members to retard relative rotation between the members and clutch means operable to a condition drivingly interconnecting the driven members to retard relative rotation therebetween by transmitting torque which is substantially larger than the torque transmitted by the torque transmitting means.

Another object of this invention is to provide a new and improved drive mechanism in accordance with the preceding paragraph wherein said torque transmitting means includes spring means mounted in a coaxial relationship with the driven members for pressing friction members against surfaces operatively associated with the driven members.

Another object of this invention is to provide a new and improved drive mechanism including a differential gear assembly for connecting output members to a source of power and enabling the output members to rotate relative to each other, and torque transmitting means including friction surfaces which are urged into engagement with friction surfaces on side gears of the differential gear assembly by spring means mounted on opposite sides of a pinion shaft of the differential gear assembly and located in coaxial alignment with each other and with the output members.

Another object of this invention is to provide a new and improved drive mechanism according to the preceding paragraph and which is relatively compact and readily assembled.

These and other objects and features of the invention will become more apparent upon the consideration of the following detailed description taken in connection with the accompanying drawings wherein.

Figure 1:
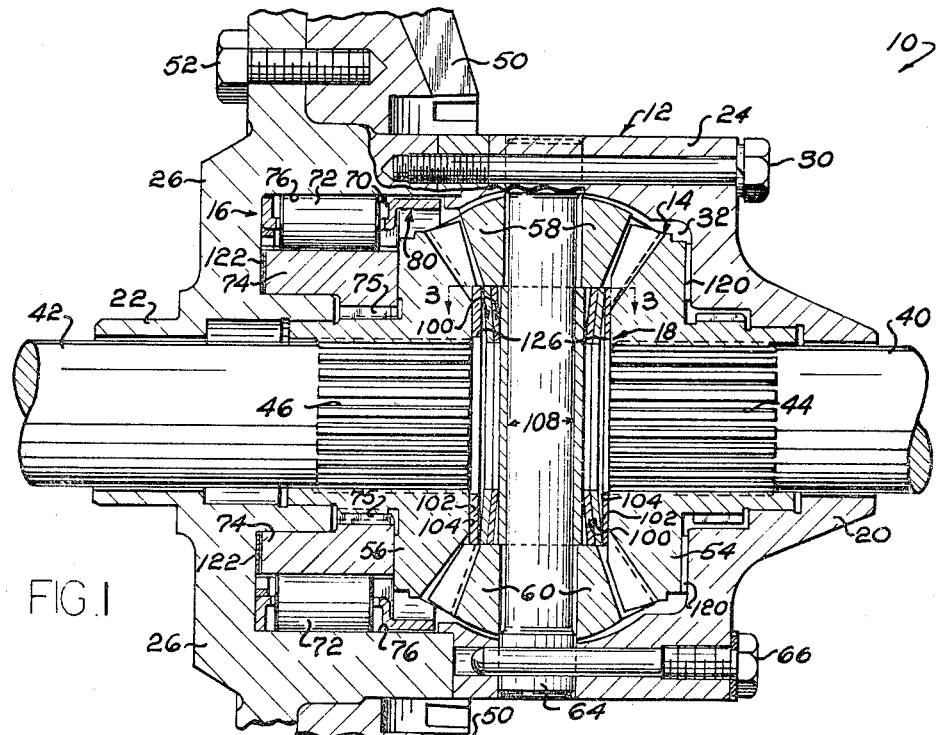
FIG. 1 is a sectional view of a differential mechanism embodying the present invention.

The present invention relates to an improved drive mechanism including a clutch assembly and a limited capacity torque transmitting means which is continuously operative to retard relative rotation between driving and driven members to thereby provide a dampening torque which eliminates drive line rattle upon operation of the clutch assembly. The clutch assembly has a relatively large torque transmitting capability and is operated to drivingly connect the driving and driven members to further retard rotation therebetween. While the drive mechanism is applicable to different environments, it is particularly well adapted for use in a vehicle as a differential. Accordingly, as representative of a preferred embodiment of the present invention the drawings illustrate a differential drive mechanism or assembly 10.

The differential drive assembly 10 is especially suitable for use in driving ground or surface engaging traction wheels of a vehicle. The differential drive assembly 10 includes a rotatable planet gear carrier or casing 12, a differential gear train 14, a clutch assembly 16 operable to retard rotation of gears of the gear train 14 relative to the planet gear carrier 12, and a limited capacity torque transmitting assembly 18.

The planet gear carrier 12 includes a pair of support portions 20 and 22 adapted to be received in bearing of a supporting structure, such as an axle housing, not shown, by which the carrier 12 is rotatably supported. The carrier 12 further includes a pair of members 24, 26 which are integrally formed with the support portions 20, 22, respectively, and are secured together by screws 30 (only one of which is illustrated). The members 24, 26 define a gear chamber 32 in which the gear train 14, clutch assembly 16, and torque transmitting assembly 18 are located. The support portions 20, 22 are provided with axial openings which communicate with the chamber 32 and receive or accommodate driven or power output means as represented by axle shafts 40, 42, respectively, whose outer end portions are connected with traction wheels, or the like, not shown, and whose inner, or adjacent end portions are connected with the gear train 14 by splines 44, 46 which are formed on the end of the shafts 40, 42.

The differential drive assembly 10 includes a ring gear 50 extending around and mounted on the carrier 12 by means of connecting screws 52 which extend through a flange portion of the planet carrier 12. A suitable drive pinion, not shown, meshes with the ring gear 50 and represents the power input means for the differential drive assembly or mechanism 10 and upon rotation effects rotation of the ring gear 50 to rotate the planet carrier 12.

The gear train 14 is operable to transmit the rotary motion of the planet carrier 12 to the output shafts 40, 42. The gear train 14 comprises a pair of bevel side gears 54, 56 and a group of bevel pinion planetary gears 58, 60 disposed between and mashed in engagement with the side gears 54, 56 for drivingly connecting the latter. The planetary gears 58, 60 are rotatably supported by the carrier 12 by means of a pinion shaft 64 extending across the gear chamber 32 and secured to the carrier 12 by an anchor pin 66.

The side gears 54, 56 and pinion gears 58, 60 are, in the preferred embodiment, all bevel gears of conventional form as far as the teeth thereof are concerned, and the tooth profiles are of a conventional shape having pressure angle values coming within the usual range of such values. The side gears 54, 56 are provided with splines which mesh with splines 44, 46 on the shafts 40, 42 to drivingly connect the side gears 54, 56 to the shafts 40, 42, respectively.

The clutch assembly 16 is a double overrunning clutch operable to retard relative rotation between the side gear 56 and the planet carrier 12. To this end, the clutch assembly 16 has a relatively large torque transmitting capability and is engageable to drivingly lock or interconnect the planet carrier 12 and the side gear 56. The clutch assembly 16 is positioned between the planet carrier 12 and the side gear 56 and includes a shiftable roller cage or frame 70, and a plurality of rollers 72, supported in openings in the shiftable roller cage 70. The openings are dimensioned so as to permit the rollers 72 to be freely rotatable and radially shiftable relative to the cage 70 and, yet, prevent circumferential movement of the rollers relative thereto.

The roller cage 70 is shiftable or movable to a position wherein the rollers 72 are wedgingly engaged between surfaces formed on an annular member 74 and a cylindrical surface 76 forming the inner periphery of the carrier 12. The annular member 74 is drivingly connected to the side gear 56 by teeth 75 so that the wedging of the rollers drivingly connects the carrier 12 and the side gear 56 together. The wedging of the rollers provides the clutch assembly with a relatively large torque transmitting capacity so that very little, if any, relative rotation occurs between the carrier 12 and the side gear 56 due to slipping of the clutch assembly 16. This operation of the clutch assembly locks up the differential gear assembly 10 in a manner which is described in detail in my copending application Ser. No. 637,112, entitled "Differential Mechanism," filed on May 9, 1967 and assigned to the same assignee as is the present invention. Of course, clutch assemblies other than the specific illustrated embodiment could be used in the differential assembly 10.

Figure 2:
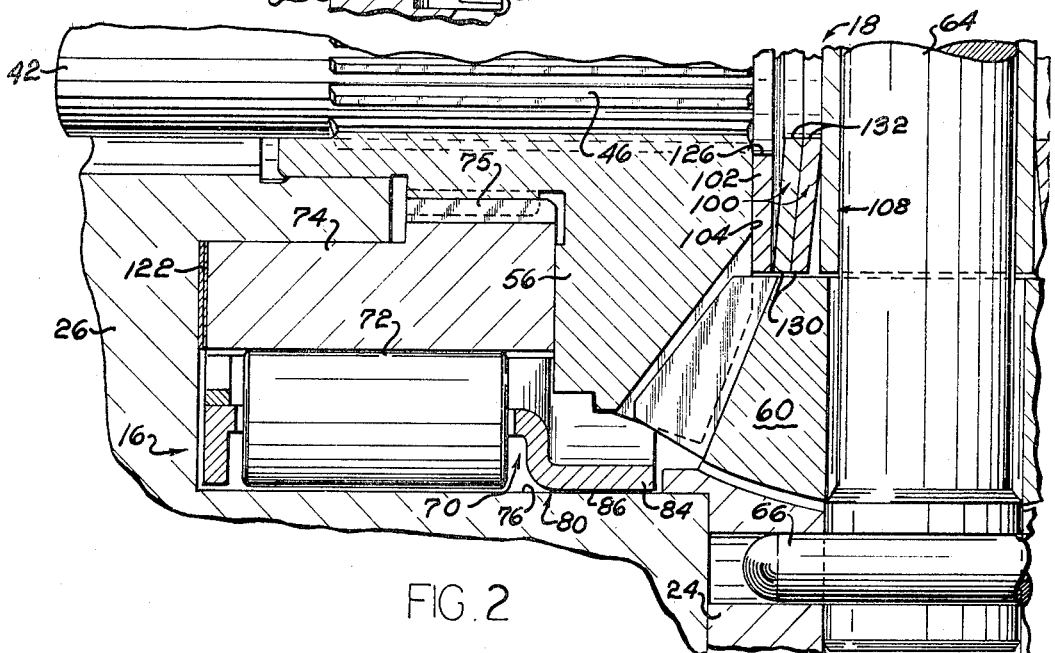
FIG. 2 is a fragmentary sectional view, on an enlarged scale, of a portion of the differential mechanism of FIG. 1.
Figure 3:
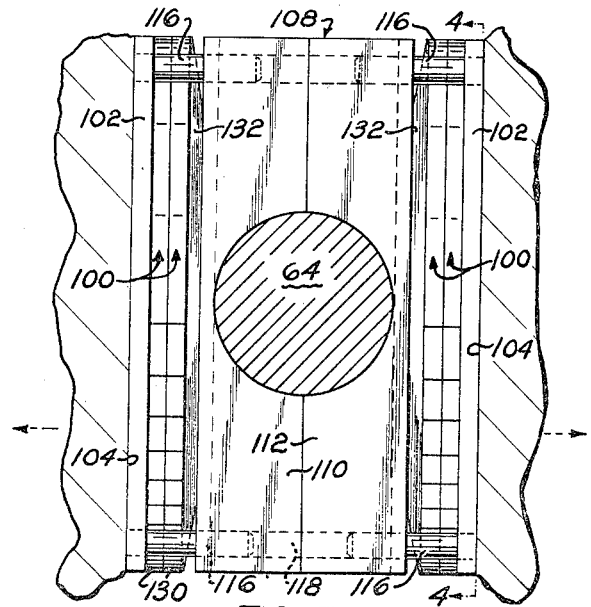
FIG. 3 is a fragmentary sectional view, taken along the line 3—3 of FIG. 1, illustrating the structure of a limited capacity torque transmitting assembly for continuously interconnecting driven members of the differential mechanisms.
Figure 4:
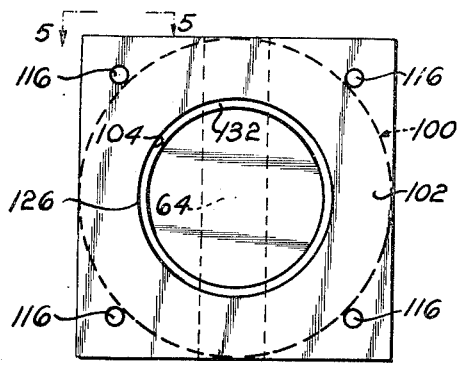
FIG. 4 is a sectional view, taken along the line 4—4 of FIG. 3, further illustrating the structure of the torque transmitting assembly.
Figure 5:
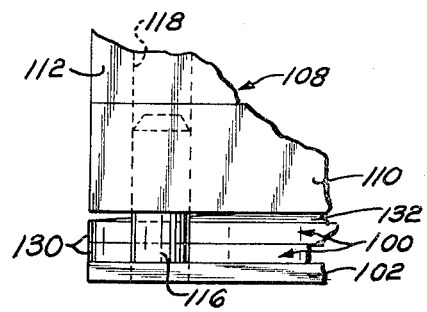
FIG. 5 is an enlarged fragmentary sectional view, taken along a line 5—5 of FIG. 4, further illustrating the structure of the torque transmitting assembly.

The clutch assembly 16 is associated with an actuator assembly or means 80 (see FIG. 2) for automatically moving the rollers 72 to their engaged positions between the surfaces on the member 74 and the surface 76 of the carrier 12 in response to a predetermined speed of relative rotation between the carrier 12 and the side gear 56. The actuator assembly 80, in the present embodiment of the invention, is a viscous coupling comprising an annular flange portion 84 of the roller cage 70. The annular flange portion 84 extends generally axially of the portion 84 has an annular outer peripheral surface 86 which lies adjacent to the similar annular surface 76 formed on the interior of the casing or planet carrier 12. The surfaces 76 and 86 form a viscous shear space therebetween in which a viscous shear fluid is located and which functions as a drive connection between the carrier 12 and the cage 70.

Upon a predetermined speed of relative rotation between the planet carrier 12 and the side gear 56, the driving force provided by the shear fluid of the viscous coupling forming the actuator assembly 80 effects a circumferential movement of the cage 70 relative to the side gear 56 so that clutch assembly 16 drivingly connects the carrier 12 and side gear 56. Thus, the actuator assembly 80 is operated in response to a predetermined rate of rotation between the side gear 56 and the carrier 12 to operatively connect the side gear and carrier 12. It will be apparent to those skilled in the art that an actuator assembly, other than the specific one illustrated could be used for operating the clutch assembly.

When the clutch assembly 16 has been operated by the actuator assembly 80, the side gear 54 is drivingly connected with the side gear 56 through the planetary gears 58, 60, the carrier 12 and the clutch assembly 16. Of course, the ring gear 50 is then connected to both of the side gears 54, 56. When the clutch assembly 16 is in a normal or release position, the differential drive train 14 functions in a well-known manner to enable the shafts 40, 42 to be rotated relative to each other. As the speed of relative rotation between the shafts 40, 42 increases, the speed of relative rotation between the carrier 12 and side gear 56 increases to automatically operate the actuator assembly 80 at a predetermined speed of relative rotation between the shafts 40, 42 to drivingly connect the shafts. When the clutch assembly 16 has been operated to drivingly connect the shafts 40, 42, relative rotation between the shafts is retarded by the clutch assembly. Thus, the clutch assembly 16 interacts with the gear train 14 to provide what is commonly called a limited slip differential mechanism.

In accordance with the present invention, the limited capacity torque transmitting assembly 18 continuously interconnects the shafts 40, 42 through the carrier 12 and the pinion shaft 64 for retarding relative rotation between the shafts 40, 42 to thereby apply an initial or dampening torque or load to the shafts 40, 42 and carrier 12 before the clutch assembly 16 is operated from the disengaged condition to the engaged condition. This initial or dampening torque is transmitted by the ring gear 50 and shafts 40, 42 to a drive line in which the differential drive assembly 10 is a component. This dampening torque is equal to or less than a predetermined amount and is effective upon relative rotation between the shafts 40, 42 to eliminate drive line rattle.

The initial or dampening torque prevents drive line rattle by applying an initial load to the drive line which offsets any slop and/or resilience in the drive line to thereby enable the clutch assembly 16 to be positively operated to the engaged position without undue cycling. To this end, the torque transmitting assembly 18 includes springs 100 which continuously press or urge friction members or elements 102 into engagement with friction surfaces 104 formed on the ends of the side gears 54, 56 (see FIGS. 1–5). The frictional engagement between the friction members 102 and the end surfaces of the side gears 54, 56 interconnects the side gears through the pinion shaft 64 and the carrier 12 to retard relative rotation of the side gears 54, 56.

The torque transmitting assembly 18 is mounted on the pinion shaft 64 by a reaction block 108 (FIG. 3) having opposing components 110, 112 which clampingly engage the pinion shaft 64 to mount the torque transmitting assambly 18 for rotation with the carrier 12 relative to the shafs 40, 42. In the present embodiment of the invention, the friction members 102 are generally rectangular side gear 56 and away from the rollers 72. The flange in shape (FIG. 4) and are connected to the reaction block 108 by guide or mounting pins 116 (see FIGS. 3 and 5) connected to corner portions of the friction members 102. The guide pins 116 are slidably received in passages or holes 118 in the reaction block 108 and are fixedly connected to the friction members 102 to enable the friction members to be moved outwardly, in the direction of the arrows in FIG. 3, from the reaction block 108 under the influence of the springs 100. This outward movement of the friction members 102 moves them into abutting engagement with the annular friction surfaces 104 on the ends of the side gears 54 and 56.

The pressure applied to the side gear 54 by the friction member 102 is transmitted to a shim 120 (FIG. 1) mounted between the side gear 54 and the carrier 12. Similarly, the reaction force applied against the side gear 56 by the associated friction member 102 presses the side gear against the annular member 74 which in turn engages a thrust washer 122 mounted between the annular member 74 and the carrier 12. The friction members 102 include generally circular central openings 126 which eliminate any possibility of interference between the friction members 102 and the shafts 40, 42.

The springs 100 are compressed between the reaction block 108 and the friction members 102 to continuously press the friction members 102 outwardly in opposite directions from the reaction block. The spring members 100 advantageously take the form of Belleville washers which are compact and can be readily mounted within the differential drive assembly 10 in a minimum amount of space. The Belleville washers or springs 100 are annular in shape and have outwardly projecting outer rims 130 which press against the back of the friction member 102. The springs 100 are located in a coaxial relationship with the shafts 40, 42 and side gears 54, 56 so that the friction members 102 are pressed evenly against the annular friction surfaces 104 on the side gears 54, 56. The guide pins 116 also serve to position the springs 100 relative to the reaction block 108.

In view of the foregoing description, it will be apparent that the torque transmitting assembly 18 includes the friction members 102 which are pressed outwardly into engagement with friction surfaces 104 on the ends of the side gears 54, 56 to retard relative rotation of the side gears. The torque transmitting assembly 18 has a relatively limited capacity. Therefore, when one of the shafts and the associated side gear tends to rotate relative to the other shaft, the influence of the torque transmitting assembly is relatively easily overcome by applying a torque which is only slightly larger than the aforementioned dampening or initial torque to the assembly 18. When this occurs, there will be relative movement between at least one of the side gears and the associated friction member 102.

When the speed of relative rotation between the side gears 54, 56 is further increased to a predetermined amount, the actuator assembly 80 will operate the clutch assembly 16 to the engaged position to interconnect the side gears 54, 56 through the carrier 12 and clutch assembly 16 to thereby retard relative rotation of the side gears 54 and 56. The clutch assembly has, compared to the torque transmitting assembly 18, a very large torque transmitting capability. Therefore, during normal operation of the differential drive assembly 10, there is no substantial relative rotation between the side gears 54, 56 upon engagement of the clutch assembly 16. The operation of the clutch assembly, under the influence of the actuator assembly 80, from the disengaged position to the engaged position is positive and substantially rattle or cycle free since the torque transmitting assembly 18 has applied an initial or dampening torque to the drive line in which the differential drive assembly 10 is a component to absorb or offset any resilience and/or sloppiness in the drive line.

In one illustrative embodiment of the invention, the torque transmitting assembly 18 has a maximum torque transmitting capability of the order of approximately 100 ft. lbs. while the clutch assembly 16 is capable of transmitting a torque on the order of approximately 3,000 ft. lbs. These illustrative torque transmitting figures are not intended to be limiting in any way but rather are intended to merely illustrate the substantial difference between the torque transmitting capabilities of the clutch assembly 16 and the torque transmitting assembly 18 in one particular embodiment of the invention. Thus, it can be seen that the dampening torque transmitting capabilities of the assembly 18 are readily overcome during operation of the differential drive assembly 10 to enable the differential drive assembly to differentiate in a well-known manner. However, when a predetermined speed of relative rotation is present between the side gear 56 and the carrier 12, the clutch assembly 16 is operated to the engaged position to retard this relative rotation with a relatively large torque transmitting capability. Of course, the relative torque transmitting capabilities of the clutch assembly 16 and torque transmitting assembly 18 can be varied to suit the particular environment in which the invention is used.

Although one embodiment of the invention has been illustrated, it is contemplated that many changes and modifications will be made by those skilled in the art. For example, it is contemplated that the specific structure and torque transmitting capabilities of both the clutch assembly 16 and torque transmitting assembly 18 could be changed for use in a drive mechanism other than the differential drive assembly shown. Therefore, it is contemplated to cover by the appended claims any such changes and modifications as fall within the true spirit and scope of the invention.

What is claimed is:

1. A drive mechanism comprising driving and driven members, clutch means operable between a first condition wherein said driving and driven members are drivingly interconnected to retard relative rotation between said members and a second condition wherein said clutch means is ineffective to drivingly connect said members, actuating means for operating said clutch means to said first condition in response to a predetermined speed of relative rotation between said members, and torque transmitting means continuously interconnecting said members for transmitting a limited torque between said members to resist relative rotation of said members independently of the condition of said clutch means.

2. A drive mechanism as set forth in claim 1 wherein said torque transmitting means includes a friction member and a resilient means for continuously pressing said friction member into operative engagement with said driven member.

3. A drive mechanism as set forth in claim 1 wherein said actuating means includes fluid coupling means cooperating with said driving member and said clutch to actuate said clutch when said predetermined speed of relative rotation occurs between said driving and driven members.

4. A drive mechanism as set forth in claim 1 wherein said driving member comprises a casing of a differential mechanism and said driven member comprises a side gear of said differential mechanism, and said torque transmitting means comprises a friction member mounted for rotation with said casing and movable relative to said casing in an axial direction relative to said side gear, and spring means mounted in a coaxial relationship with said side gear and friction member for rotation therewith relative to said side gear when relative rotation occurs between said casing and side gear against the influence of said torque transmitting means, said friction member being pressed in an axial direction against said side gear by said spring means to frictionally transmit torque between said casing and side gear to thereby resist relative rotation of said casing and side gear.

5. A drive mechanism as set forth in claim 4 wherein said actuating means includes fluid coupling means cooperating with said casing for operating said clutch means upon the occurrence of said predetermined speed of relative rotation between said side gear and said casing.

6. A differential gear mechanism comprising a rotatable power input assembly, a pair of driven members, differential gear means driving said members from said input assembly and enabling said members to rotate relative to each other, torque transmitting means continuously interconnecting said members for retarding relative rotation between said members by transmitting torque which is equal to or less than a first predetermined amount, clutch means operable between a first condition drivingly interconnecting said members to retard relative rotation between said members by transmitting a torque which is equal or less than a second predetermined amount which is substantially larger than said first predetermined amount and a second condition wherein said clutch means is ineffective for transmitting torque between said members, and actuating means for operating said clutch means from said second condition to said first condition upon the occurrence of a predetermined speed of relative rotation between said members.

7. A differential gear mechanism as set forth in claim 6 wherein said differential gear means includes first and second side gears, and said torque transmitting means includes a first friction member which is pressed into frictional engagement with said first side gear by a first spring and a second friction member which is pressed into frictional engagement with said second side gear by a second spring.

8. A differential gear mechanism as set forth in claim 7 wherein said first and second springs are Belleville washers located in a coaxial relationship with said first and second side gears and rotatable relative to said first and second side gears with said power input assembly.

9. A differential gear mechanism as set forth in claim 7 wherein said first and second friction members are mounted for rotation with said power input assemby and are urged away from each other towards said first and second side gears respectively by said first and second springs which are mounted in a coaxial relationship with said side gears.

10. A differential gear mechanism comprising a rotatable power input assembly, a pair of driven members, differential gear means for driving said members from said input assembly and enabling said members to rotate relative to each other, torque transmitting means continuously interconnecting said members for retarding relative rotation between said members by transmitting torque which is equal to or less than a first predetermined amount, clutch means operable between a first condition drivingly interconnecting said members to retard relative rotation between said members by transmitting a torque which is equal or less than a second predetermined amount which is substantially larger than said first predetermined amount and a second condition wherein said clutch means is ineffective for transmitting torque between said members, and actuating means for operating said clutch means from said second condition to said first condition upon the occurrence of a predetermined speed of relative rotation between said members, wherein said power input assembly includes a rotatable carrier, a pinion shaft mounted on said carrier, and a reaction block fixedly connected to said shaft, said differential gear means includes first and second pinion gears mounted on said shaft on opposite sides of said reaction block for rotation relative to said carrier and first and second side gears connected to said driven member and mounted in meshing engagement with said pinion gears, and said torque transmitting means includes first and second friction members mounted on opposite sides of said reaction block for frictionally engaging said side gears, guide means for mounting said friction members on said reaction block and retaining said friction members against rotation relative to said reaction block while enabling said friction members to move laterally relative to said reaction block, and first and second spring means located between said first and second friction members respectively and said reaction block in a coaxial relationship with said side gears for pressing said first and second friction members outwardly from said reaction block into engagement with said side gears.

11. A differential gear mechanism as set forth in claim 10 wherein said guide means includes a plurality of pins which slidably engage said reaction block and wherein said first and second spring means are positioned relative to said reaction block by said pins.

12. A differential gear mechanism as set forth in claim 11 wherein said first and second spring means includes a plurality of Belleville washers.

13. A differential gear mechanism as set forth in claim 6 wherein said torque transmitting means includes friction members for frictionally retarding relative rotation between said driven members and spring means mounted in a coaxial relationship with said driven members for pressing said friction members against surfaces operatively associated with said driven members.

14. A differential gear mechanism as set forth in claim 6 wherein said actuating means includes fluid coupling means having one surface mounted for rotation with said power input assembly and a second surface member for rotation with one of said driven members and spaced apart from said first surface with a fluid between said surfaces, said fluid coupling means being responsive to a predetermined speed of relative rotation between said power input assembly and said driven members to operate said clutch means to said first condition.

15. A drive mechanism comprising a power input assembly including a carrier and a pinion shaft, output members, differential gear means for interconnecting said power input assembly and said outpjut members and enabling said output members to rotate relative to each other, said differential gear means including first and second side gears located on opposite sides of said shaft and connected to said output members, and a pair of pinion gears mounted on said shaft in meshing engagement with said side gears, torque transmitting means continuously interconnecting said output members for retarding relative rotation between said output members, said torque transmitting means including a first pair of friction surfaces mounted on opposite sides of said shaft for rotation with said carrier and a second pair of friction surfaces mounted on opposite sides of said shaft for rotation with said output members, and first and second spring means mounted on opposite sides of said shaft in coaxial alignment with each other and said output members for continuously urging said first and second pairs of surfaces into frictional engagement to thereby retard relative rotation between said output members, said power input assembly further including a reaction block located between said pinion gears and connected to said shaft for rotation relative to said output members with said carrier, and said torque transmitting means further includes means for movably connecting said first pair of friction surfaces to said reaction block, said second pair of friction surfaces being operatively connected to said side gears, and said first and second spring means being located between said reaction block and said first pair of surfaces to press said first pair of surfaces outwardly from said reaction block into engagement with said second pair of friction surfaces.

16. A drive mechanism as set forth in claim 15 wherein said first pair of surfaces are operatively connected to said shaft, said second pair of surfaces are operatively connected to said side gears, and said first and second spring means is located between said shaft and said first pair of surfaces.

17. A drive mechanism as set forth in claim 15 wherein said first and second spring means includes a plurality of Belleville washers mounted for rotation relative to said output members with said carrier.

References Cited

UNITED STATES PATENTS

| | | | |
|---|---|---|---|
| 1,446,545 | 2/1923 | Brush et al. | 74—710.5 |
| 2,821,096 | 1/1958 | Lyeth | 74—711 |
| 3,008,350 | 11/1961 | Misener | 74—710.5 |
| 3,276,290 | 10/1966 | Randall | 74—711 |
| 3,313,180 | 4/1967 | Balfour et al. | 74—711 |
| 3,324,744 | 6/1967 | Roper | 74—711 |
| 3,326,064 | 6/1967 | Ordorica | 74—711 |
| 3,388,779 | 6/1968 | Roper | 192—44 |

FOREIGN PATENTS 1,004,689　9/1965　Great Britain.

ARTHUR T. McKEON, Primary Examiner